US007663652B1

(12) United States Patent
Reese

(10) Patent No.: US 7,663,652 B1
(45) Date of Patent: Feb. 16, 2010

(54) ENHANCED ELECTRONIC MAIL DELIVERY SYSTEM

(76) Inventor: Morris Reese, P.O. Box 6651, Thousand Oaks, CA (US) 91359

( * ) Notice: Subject to any disclaimer, the term of this patent is extended or adjusted under 35 U.S.C. 154(b) by 0 days.

(21) Appl. No.: 09/564,666

(22) Filed: May 3, 2000

(51) Int. Cl.
*G06F 3/00* (2006.01)
(52) U.S. Cl. ........................................ 345/744; 709/203
(58) Field of Classification Search ................ 305/733, 305/751, 762, 765, 744, 740, 804, 808; 709/203, 709/206, 205, 204
See application file for complete search history.

(56) References Cited

U.S. PATENT DOCUMENTS

| | | | |
|---|---|---|---|
| 5,487,100 A | | 1/1996 | Kane |
| 5,870,548 A | | 2/1999 | Nielsen |
| 5,905,777 A | | 5/1999 | Foladare et al. |
| 5,944,786 A | | 8/1999 | Quinn |
| 5,956,486 A | | 9/1999 | Hickman et al. |
| 5,963,208 A | * | 10/1999 | Dolan et al. ................ 345/854 |
| 5,995,597 A | | 11/1999 | Woltz et al. |
| 6,014,689 A | * | 1/2000 | Budge et al. ................ 709/206 |
| 6,026,368 A | | 2/2000 | Brown et al. |
| 6,453,327 B1 | * | 9/2002 | Nielsen ....................... 707/500 |

OTHER PUBLICATIONS

"All About Internet Mail", By Lee David Jaffe, Internet Workshop Series 7, ISBN: 1-882208-20-X.
"E-Mail-A Practical Guide", By Simon Collin, ISBN: 0750621125.
"Universal Access to Email", By Robert H. Anderson, Tora K. Bikson, Sally Ann Law, Bridger M. Mitchell, ISBN: 0833023314.
"Writing Effective E-Mail", By Nancy Flynn, Tom Flynn, ISBN: 1-56052-515-0.
"A Guide To The TCP/IP Protocol Suite", By Floyd Wilder, 1998 2$^{nd}$ Edition, ISBN: 0-89006-976-X.
"Internet E-Mail; Protocols, Standards - - - ", By Lawrence Hughes, ISBN: 0-89006-939-5.

* cited by examiner

*Primary Examiner*—Cao H. Nguyen

(57) ABSTRACT

The method is implemented using a control program shown in FIG. 1 running on a host-based or a Local Area Network server which receives incoming electronic mail (e-mail) messages over a network, which is connected at least periodically to a Wide Area Network or Internet, and stores the e-mail messages in a recipient's private mail box. The server is responsive to a send list signal from the recipient for sending a summary list of brief headers of the e-mail messages to the recipient so that the recipient can select a specific e-mail message to read. The recipient selects the specific e-mail message to read by sending a selection signal to the server which then makes a decision to determine whether the recipient is an opt-in customer who has given approval to receive e-mail messages with advertisements introduced within the e-mail messages. Assuming that the recipient is an opt-in customer, the server selects from the e-mail messages the specific e-mail message which relates to the selection signal received from the recipient, selects from a plurality of advertisements stored in an associate database an advertisement which corresponds to the recipient's name in the selected e-mail message header and which is aligned with the personal interests of the recipient, and sends the selected e-mail message to the recipient and introduces the selected advertisement within the selected e-mail message as it is sent to the recipient.

21 Claims, 2 Drawing Sheets

ENHANCED ELECTRONIC MAIL DELIVERY SYSTEM

FIELD OF THE INVENTION

The invention relates generally to electronic mail delivery systems and more particularly to a method and apparatus for transferring to a recipient's electronic mail receiving device an electronic mail message with an advertisement introduced within the electronic mail message.

BACKGROUND OF THE INVENTION

Most e-mail systems allow inclusion of attachments which are binary files such as formatted documents, graphics and programs. The purpose of this function is to send items in their original format over the network. Thus you can attach a word processing file, complete with formatting features—underlining, boldface, fonts—or a graphic image that cannot be displayed over ordinary e-mail. You attach a file by including its name in the appropriate field in the message header. Files can be attached only when they are located where the e-mail program can find them. With host-based programs like PINE, files to be attached have to be located on the host system. Files on your local workstation have to be transferred to the host before they can be attached to a PINE message. Since each mail system handles attachments differently, it is critical to check with recipients beforehand. Attachments are not displayed within the message, but a flag in the mail header tells the recipient that a file is attached. At the receiving end of a message with an attachment, you are notified that there is something special going on, sometimes with some information about what to do. You detach the file from the message in order to view or use the item with the appropriate software. When the e-mail software runs on your workstation, files received as attachments end up on your hard disk automatically. With a host-based e-mail system, getting an incoming attachment to your local workstation requires transferring it from the host.

With respect to reviewing e-mail message summaries, the first view you get of incoming mail is usually a list of brief headers, including shortened versions of the date and time the messages was sent, the name of the sender, and the subject heading the sender gave it. The actual content and format of your message will vary according to your local system, but the principle is essentially the same. Your inbox contains all the new mail you have received but have not yet read. It also can contain old mail, read but not deleted, from previous sessions and, for a time, may even include messages you have deleted but not yet purged.

With respect to downloading and uploading files, it sometimes may be necessary to move files between computers in order to have items where they can be used effectively. For example, with host-based systems, messages and attachments arrive at the server. The incoming messages may be a document you wish to edit with your workstation's word processing program. Attachments to e-mail messages are coded documents that can be read only by programs on your workstation or may be programs themselves that must be run on your own system. In each case, you would have to transfer, or download, the file from the host to your own workstation (computer). Likewise, you may create files on your workstation that you wish to include as part of an e-mail message. In those cases, you will need to transfer, or upload, those files to the host system before you can use them in e-mail. In an efficient messaging engine, when a message with an attachment is sent, the attachment is stored on the post office server and the mail delivered to the recipient. Only when the recipient makes a request to open the attachment is it retrieved from the server.

The ease of sending e-mail messages on the Internet has created a significant amount of junk electronic mail that is indiscriminately downloaded into the recipient's personal computer. Value time is wasted by recipient's who must winnow through unsolicited junk mail messages to find useful e-mail relevant to their personal interests.

For the foregoing reasons, it is therefore an object of the present invention to download to an electronic mail (hereinafter sometimes referred to as "e-mail") receiving device of a recipient for reading, printing, text-to-speech and/or storing an e-mail message with an inserted advertisement which is relevant to the recipient personal interests.

It is another object of the present invention to allow the e-mail recipient to "opt-in" (receive e-mail messages with inserted advertisements) or "opt-out" (receive e-mail messages without inserted advertisements).

SUMMARY OF THE INVENTION

Accordingly, a technical advance is achieved by method and apparatus for downloading (transferring) to a recipient's e-mail receiving device an e-mail message with an advertisement introduced within the e-mail message.

In the present invention, e-mail messages are received to a server servicing a recipient, where they are stored in the recipient's private mail box. After a send list signal is received from the recipient's e-mail receiving device (i.e. personal computer, fax, pager, wired or wireless telephone) indicating that the recipient wishes to view a summary list of brief headers of the stored e-mail messages, software on the server sends a shortened version of the date and time the e-mail messages were sent, including the name of the senders, the name of the recipient, and the subject headings the senders gave them. The recipient's private mail box may also contain other e-mail messages, read but not deleted, from previous sessions and, for a time, may even include messages that have been deleted but not yet purged. In continuance of the present invention, software on the server makes a decision to determine whether a selection signal has been received from the recipient's e-mail receiving device indicating that the recipient wishes to read a specific e-mail message of the stored e-mail messages. If it is determined that the selection signal has been received, software on the server makes another decision to determine whether the recipient is an opt-in customer (i.e. a recipient who has agreed with its service provider to receive e-mail messages with inserted advertisements). If it is determined that the recipient is, indeed, an opt-in customer, software on the server selects from the e-mail messages stored in the recipient's private mail box an e-mail message which is specifically related to the selection signal received from the recipient's e-mail receiving device, selects from a plurality of advertisements stored in an associate database an advertisement which corresponds to the recipient's name in the selected e-mail message header and which is aligned with the personal interests of the recipient, and downloads (transfers) the selected e-mail message to the recipient's e-mail receiving device and inserts the selected advertisement into the selected e-mail message as it is downloaded to the recipient's e-mail receiving device. The selected advertisement when displayed within the selected e-mail message at the recipient's e-mail receiving device can state, for example, "This e-mail sponsored by Doubleclick.Com" or "This e-mail sponsored by MSN.COM" or "Barnes&Nobles.Com" or any other web site.

Alternatively, if it is determined that the selection signal has been received after the summary list of brief headers of the stored e-mail messages have been downloaded to the recipient's e-mail receiving device for viewing, software on the server selects from the stored e-mail messages in the recipient's private mail box an e-mail message which is specifically related to the selection signal received from the recipient's e-mail receiving device, selects from a plurality of advertising messages stored in an associate database an advertisement which corresponds to the recipient in the selected e-mail message header and which is relevant to the recipient personal interests, and transfers (downloads) the selected e-mail message to the e-mail receiving device of the recipient and introduces the selected advertisement into the selected e-mail message as it is transferred to the e-mail receiving device of the recipient.

From another perspective, the present invention provides an apparatus for receiving e-mail messages over a network, which is connected at least periodically to a Wide Area Network or Internet, and storing the received e-mail messages in a recipient's private mail box associated with the apparatus. The apparatus responds to a send list signal from the recipient's e-mail receiving device by transferring (downloading) a summary list of brief headers of the e-mail messages stored in the recipient's private mail box. If it is determined that a selection signal has been received from the recipient's e-mail receiving device indicating that the recipient wishes to select a specific e-mail message to read from the stored e-mail messages, and if it is determined that the recipient is an opt-in customer who has agreed to receive e-mail messages with advertisement insertions, the apparatus responds by selecting from the stored e-mail messages in the recipient's private mail box an e-mail message which is specifically related to the selection signal received from the recipient's e-mail receiving device, selecting from a plurality of advertisements stored in an associate database an advertisement which corresponds to the recipient's name in the selected e-mail message header and which is aligned with the personal interests of the recipient, and downloading (transferring) the selected e-mail message to the recipient's e-mail receiving device and inserting the selected advertisement within the selected e-mail as it is downloaded (transferred) to the recipient's e-mail receiving device.

From yet another perspective, the apparatus alerts the recipient to the arrival of a new e-mail message by downloading to the recipient's e-mail receiving device a brief header of the newly arrived e-mail message. If a selection signal is received from the recipient's e-mail receiving device indicating that the recipient wishes to read the full text of the newly arrived e-mail message, the apparatus responds by selecting the newly arrived e-mail message from the recipient's private mail box storage queve, selecting from a plurality of advertisements stored in an associate database an advertisement which corresponds to the recipient's name in the selected e-mail message header and which is relevant to the personal interests of the recipient, and downloading the selected e-mail message to the recipient's e-mail receiving device and simultaneously inserting the selected advertisement into the e-mail message as it is downloaded to the e-mail receiving device of the recipient for reading, printing, text-to-speech and/or storing.

BRIEF DESCRIPTION OF THE DRAWINGS

A more complete understanding of the invention may be obtained from the following description and the accompanying drawings in which.

BEST MODES FOR CARRYING OUT THE INVENTION

Figure 1:
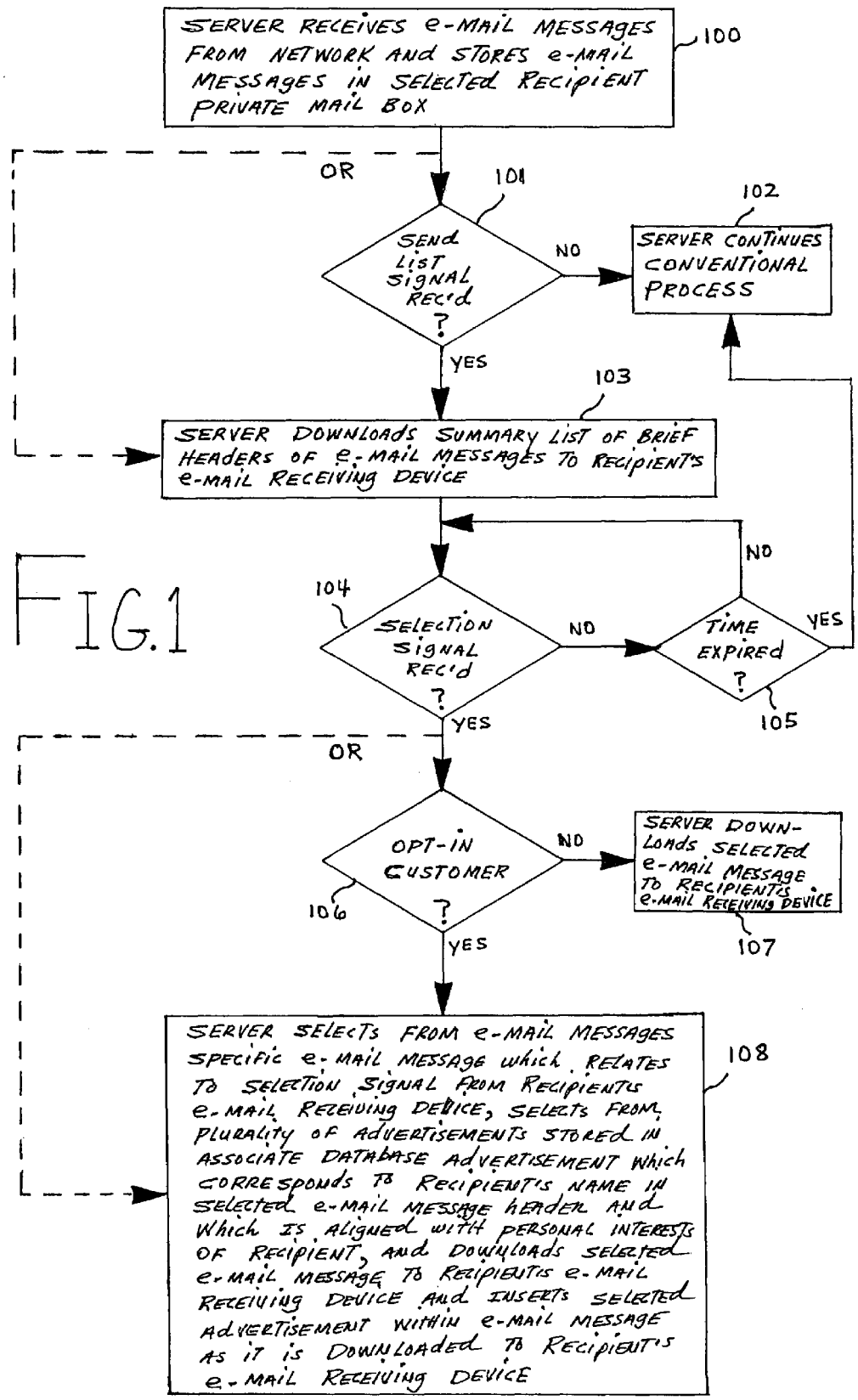
FIG. 1 shows, in flow chart form, the sequence of operations of the method of the invention.

Referring now to FIG. 1, (step 100) transmitted e-mail messages are received to a server servicing a recipient over a network, which is connected at least periodically to the Internet or Wide Area Network (not shown), and stored in the recipient's private mail box (not shown) associated with the server. can be a host-based server model, a client/server model, or a Local Area Network (LAN) model.

At step 101, software on the server determines whether a send list signal has been received from the recipient's e-mail receiving device (i.e. personal computer, fax, pager, terminal, mobile or wireline telephone) indicating that the recipient wishes to see a summary list of brief headers of the e-mail messages stored in his or her private mail box. If it is determined that a send list signal has not been received, (step 102) conventional, prior art, e-mail processing on the server continues. However, if it is determined that a send list signal has been received, (step 103) software on the server downloads (transfers) to the recipient's e-mail receiving device the summary list of brief headers of the e-mail messages stored in the recipient's private mail box for viewing, including shortened versions of the date and time the e-mail messages were sent, the name of the senders, and the subject headings the senders gave them. The recipient's private mail box storage queve contains all the new mail received but not read. It also can contain old mail, read but not deleted, from previous sessions and, for a time, may even include messages that have been deleted but not yet purged. Thus far, all of the processing of the present invention, specifically steps 100, 101, 102 and 103, have been accomplished in a conventional, prior art, manner for an e-mail system.

At step 104, software on the server makes a decision to determine whether a selection signal has been received from the recipient's e-mail receiving device indicating that the recipient wishes to select from the e-mail messages stored in his or her private mail box a specific e-mail message to read. If it is determined that a selection signal has not been received from the recipient's e-mail receiving device, (step 105) software on the server makes another decision to determine whether a predetermined time period has expired for the recipient to make a selection. If it is determined that the predetermined time period has expired, (step 102) conventional, prior art, e-mail processing on the server continues. Alternatively, if the predetermined time period has not expired, (step 104) processing is the same as previously described. If it is determined that a selection signal has, indeed, been received, (step 106) software on the server makes another decision to determine whether the recipient is an opt-in customer who has an agreement with his or her e-mail service provider to receive e-mail messages with advertisement insertions. If it is determined that the recipient is not an opt-in customer, (step 107) software on the server selects from the e-mail messages stored in the recipient's private mail box storage queve a specific e-mail message which relates to the selection signal received from the recipient's e-mail receiving device and downloads (transfers) to the recipient's e-mail receiving device the selected e-mail message for reading, printing, text-to-speech and/or storing. In the alternative, if it is determined that the recipient is an opt-in customer, (step 108) software on the server selects from the e-mail messages stored in the recipient's private mail box storage queve a specific e-mail message which relates to the selection signal received from the recipient's e-mail receiving device, selects from a plurality of advertisements stored in an associate database an advertisement which corresponds to the recipient's name in the selected e-mail message header and which is aligned with the personal interests of the recipient, and transfers (downloads) the selected e-mail message to the recipient's e-mail receiving device and introduces the selected advertisement within the e-mail message as it is transferred to the recipient's e-mail receiving device. It is to be understood that the selected advertisement inserted or introduced within or into the selected e-mail message can be pictorial and/or can state, for example, "This e-mail sponsored by EBay.Com" or "This e-mail sponsored by Gateway-.Com" or "GTEnetworking.Com" or any other web site.

Referring now back to step 100, in the alternative, after software on the server receives a new e-mail message over the network and stores the received e-mail message in the recipient's private mail box storage queve, (steps 103, 104 and 108 or steps 103, 104, 105 and 102 or steps 103, 104, 106 and 107 or steps 103, 104, 106 and 108) processing is the same as previously described.

Figure 2:
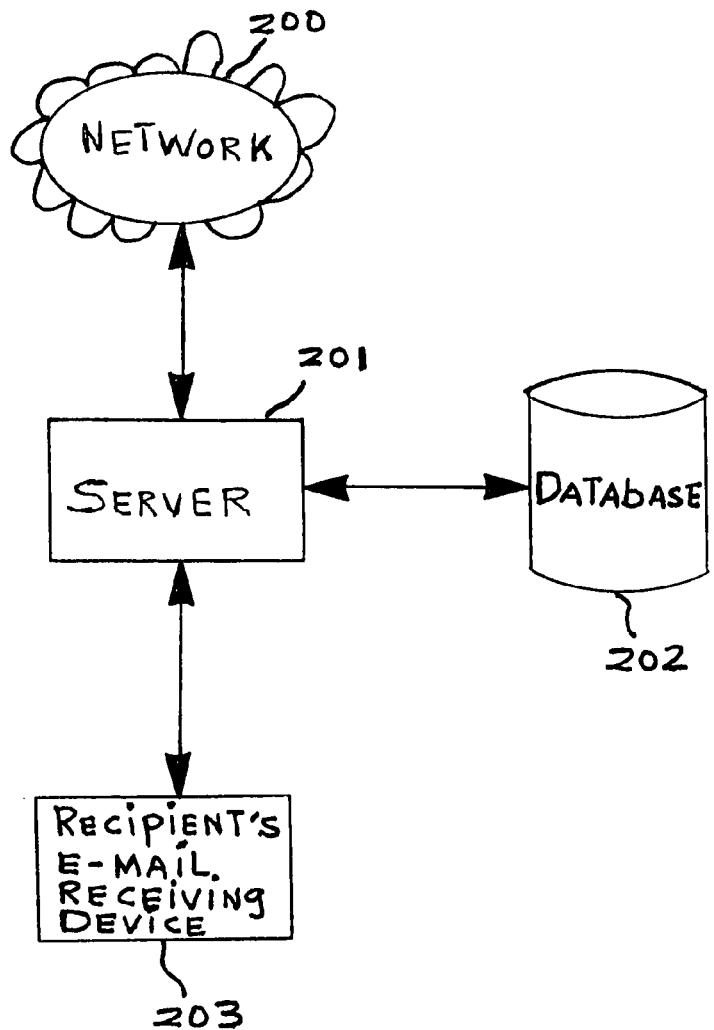
FIG. 2 shows, in block diagram form, the network 200, which is connected at least periodically to the Wide Area Network or Internet (not shown), and the database 202 connected to the server 201 which services the recipient's e-mail receiving device 203.

The general organization, of an e-mail system employing the invention is illustrated in the block diagram of FIG. 2 which shows the network 200, which is connected at least periodically to the Internet or Wide Area Network (not shown), the server 201, the database 202, and the recipient's e-mail receiving device 203. By way of example, the sever 201 can be of the type disclosed in U.S. Pat. No. 5,944,786 to Quinn of Aug. 31, 1999, in U.S. Pat. No. 5,905,777 to Foladare et al. of May 18, 1999, in U.S. Pat. No. 5,995,597 to Woltz et al. of Nov. 30, 1999, in U.S. Pat. No. 5,956,486 to Hickman et al. of Sep. 21, 1999, as well as in a book entitled "A Guide to the TCP/IP Protocol Suite", 1998, 2nd Edition, by Floyd Wilder, ISBN 0-89006-976-X, and in a book entitled "Internet E-Mail, Protocols, Standards . . . ", by Lawrence Hughes, ISBN 0-89006-939-5. These citations and books are incorporated by reference herein and may be referred to for a more comprehensive understanding of the construction and operation of the e-mail system, but a brief description will be given herein to illustrate how the invention functions within an e-mail system.

The server 201 is controlled by a control program shown in FIG. 1 and other miscellaneous programs which have not been shown to simplify the drawing. The programs are composed of executable instructions which, when executed by a processor (not shown) of the server 201, carry out the functions performed by the server 201.

The server 201 (step 100 of FIG. 1) receives transmitted e-mail messages over the network 200 and stores the received e-mail messages in a recipient's private mail box (not shown) associated with the server 201, as described in the aforementioned citations and books incorporated by reference herein. The received e-mail messages show fields for the destination address, the sender's ID, the title of the e-mail messages, and the e-mail messages ID. As previously stated herein, the server 201 is controlled by the control program shown in FIG. 1. For example, in response to a send list signal from a recipient's e-mail receiving device, as shown in step 101 of FIG. 1, indicating that the recipient wishes to view a summary list of brief headers of the e-mail messages stored in the recipient's private mail box, (step 103 of FIG. 1) the processor (not shown) of the server 201, under the control of the control program shown in FIG. 1, downloads (transfers) to the recipient's e-mail receiving device 203 for viewing the summary list of brief headers of the stored e-mail messages, as described in the citations and books incorporated by reference herein. In the alternative, as described in U.S. Pat. No. 5,905,777 to Foladare of May 18, 1999, (steps 100 and 103 of FIG. 1) the server 201 alerts the recipient to a newly arrived e-mail message by automatically downloading the newly arrived e-mail message to the recipient's e-mail receiving device 203.

In accordance with the present invention, (step 104 of FIG. 1) the processor (not shown) of the server 201, under the control of the control program shown in FIG. 1, determines whether a selection signal has been received from the recipient's e-mail receiving device 203 indicating that the recipient wishes to select from the e-mail messages stored in the private mail box a specific e-mail message to read. If it is determined that a selection signal has been received, (step 106 of FIG. 1) the processor of the server 201 determines whether the recipient is an opt-in customer who is obligated to receive e-mail messages with inserted advertisements. If it is determined that the recipient is, indeed, an opt-in customer, (step 108 of FIG. 1) the processor (not shown) of the server 201 selects from the e-mail messages stored in the recipient's private mail box (not shown) an e-mail message which is related to the selection signal received from the recipient's e-mail receiving device 203, selects from a plurality of advertisements (not shown) stored in an associate database 202 an advertisement which corresponds to the recipient's name in the selected e-mail message header and which is relevant to the personal interests of the recipient, and downloads the selected e-mail message to the recipient's e-mail receiving device 203 and introduces the selected advertisement into the selected e-mail message, preferably in the message header or between the message header and body (text), or after the text, as it is downloaded to the recipient's e-mail receiving device 203 for reading, printing, text-to-speech and/or storing. Again, it will be appreciated that the selected advertisement inserted or introduced within or into the selected e-mail message as it is downloaded to the recipient's e-mail receiving device 203 can be pictorial, or it can be pictorial and state, for example, "This e-mail is sponsored by CNN.Com" or "This e-mail sponsored by Wallstjournal.Com", etc.

In an alternative mode, (steps 104 and 108 of FIG. 1) the processor (not shown) of the server 201, under the control of the control program shown in FIG. 1, responds to a selection signal from the recipient's e-mail receiving device 203 by selecting from the e-mail messages stored in the recipient's private mail box storage queve a specific e-mail message which relates to the selection signal received from the recipient's e-mail receiving device 203, selecting from a plurality of advertising messages (not shown) stored in an associate database 202 an advertisement which corresponds to the recipient's name in the selected e-mail message header and which is aligned with the personal interests of the recipient, and introducing the selected advertisement into the selected e-mail message while transferring the message to the recipient's e-mail receiving device 203 for reading, printing, text-to-speech and/or storing.

It will be appreciated further that the database 202 archives a plurality of advertisements that are aligned with the personal interests of the corresponding recipients. It will be appreciated still further that the insertion of the selected advertisement into the selected e-mail message, and that the selection of the specific e-mail message to read from the plurality of stored e-mail messages, can be accomplished by any known technique and thus is not limited to any disclosure herein.

While the best mode for carrying out the invention has been disclosed, those familiar with the particular art to which this invention relates will recognize various alternative designs and embodiments for practicing the invention as defined by the following claims.

What is claimed is:

1. A method for transferring to a recipient's electronic mail (e-mail) receiving device an e-mail message and inserting an advertisement into the e-mail message as it is transferred to the recipient's e-mail receiving device, comprising the steps of:
    (a) receiving at a server servicing the recipient e-mail messages from a network, which is connected at least periodically to a Wide Area Network or Internet, and storing said received e-mail messages in the recipient's private mail box;
    (b) the server, in response to receiving a send list from the recipient's e-mail receiving device indicating that the recipient wishes to view a summary list of brief headers of said stored e-mail messages in said private mail box, transferring the summary list of brief headers of said stored e-mail messages to the recipient's e-mail receiving device; and
    (c) the server, in response to receiving a selection signal from the recipient's e-mail receiving device indicating that the recipient wishes to read a specific one of said e-mail messages stored in said private mail box, selecting from said stored e-mail messages an e-mail message which relates to the selection signal received from the recipient's e-mail receiving device, selecting from a plurality of advertisements stored in an associate database an advertisement which corresponds to the recipient's name in said selected e-mail message header and which is aligned with the recipient's personal interests, and transferring said selected e-mail message to the recipient's e-mail receiving device and inserting said selected advertisement into said selected e-mail message as it is transferred to the recipient's e-mail receiving device for reading, printing, text-to-speech and/or storing.

2. A method for downloading an electronic mail (e-mail) message to a recipient's e-mail receiving device and inserting an advertisement into said e-mail message as it is downloaded to the recipient's e-mail receiving device, comprising the steps of:
    (a) receiving, at a server servicing the recipient, e-mail messages over a network and storing said received e-mail messages in a private mail box of the recipient;
    (b) the server, in response to receiving a send list signal from the recipient's e-mail receiving device indicating that the recipient wishes to see brief headers of said stored e-mail messages, downloading said brief headers of said stored e-mail messages to the recipient's e-mail receiving device; and
    (c) the server, in response to receiving a selection signal from the recipient's e-mail receiving device indicating that the recipient wishes to read one of said stored e-mail messages, selecting from said stored e-mail messages a specific e-mail message which relates to the selection signal received from the recipient's e-mail receiving device, selecting from a plurality of advertisements stored in an associate database an advertisement which corresponds to the recipient's name in said selected e-mail message header and which is relevant to the recipient personal interests, and downloading said selected e-mail message to the recipient's e-mail receiving device and inserting said selected advertisement within said e-mail message as it is downloaded to said e-mail receiving device for reading, printing, text-to-speech and/or storing.

3. A method for transferring an electronic mail (e-mail) message to a recipient's e-mail receiving device and introducing an advertisement within said e-mail message as it is transferred to the recipient's e-mail receiving device, comprising the steps of:
    (a) receiving at a server servicing the recipient e-mail messages from a network and storing said received e-mail messages in the recipient's private mail box;
    (b) the server, in response to receiving a send list signal from the recipient's e-mail receiving device indicating that the recipient wishes to view brief headers of said stored e-mail messages, transferring said brief headers of said stored e-mail messages to the recipient's e-mail receiving device;
    (c) the server, in response to receiving a selection signal from the recipient's e-mail receiving device indicating that the recipient wishes to read a specific one of said stored e-mail messages, determining whether the recipient is an opt-in customer; and
    (d) the server selecting from said stored e-mail messages a specific e-mail message which relates to the selection signal received from the recipient's e-mail receiving device, selecting from a plurality of advertisements stored in an associate database an advertisement which corresponds to the recipient's name in said selected e-mail message header and which is aligned with the recipient personal interests, and transferring said selected e-mail message to the recipient's e-mail receiving device and introducing said selected advertisement within said e-mail message as it is transferred to the recipient's e-mail receiving device if it is determined that the recipient is an opt-in customer.

4. A method for downloading an electronic mail (e-mail) message to a recipient's e-mail receiving device and inserting an advertisement into said e-mail message as it is downloaded to the recipient's e-mail receiving device, comprising the steps of:
    (a) receiving at a server servicing the recipient an e-mail message from a network and storing said received e-mail message in the recipient's private mail box, said server automatically downloading a brief header of said received e-mail message to the recipient's e-mail receiving device;
    (b) said server determining whether a selection signal has been received from the recipient's e-mail receiving device indicating that the recipient wishes to read a specific e-mail message in said private mail box;
    (c) said server determining whether the recipient is an opt-in customer if the selection signal has been received from the recipient's e-mail receiving device; and
    (d) said server selecting from said private mail box storage queve the specific e-mail message which relates to the selection signal received from the recipient's e-mail receiving device, selecting from a plurality of advertisements stored in an associate database an advertisement which corresponds to the recipient's name in said selected e-mail message header and which is relevant to the recipient personal interests, and downloading said selected e-mail message to the recipient's e-mail receiving device and inserting said selected advertisement into said e-mail message as it is downloaded to the recipient's e-mail receiving device if the recipient is an opt-in customer.

5. An enhanced electronic mail (e-mail) system, comprising:
  (a) a network which is connected at least periodically to a Wide Area Network or Internet;
  (b) a server having means for receiving from the network e-mail messages addressed to a selected recipient;
  (c) the server having means for storing said received e-mail messages in an addressable private mail box having the recipient's name associated therewith;
  (d) the server having means for downloading a summary list of brief headers of said stored e-mail messages to the recipient's e-mail receiving device if a send list signal has been received from said e-mail receiving device indicating that the recipient wishes to view said brief headers of said stored e-mail messages;
  (e) the server having means for determining whether a selection signal has been received from said e-mail receiving device of the recipient indicating that a specific e-mail message relating to the selection signal is to be selected from said stored e-mail messages;
  (f) the server having means for determining whether the recipient is an opt-in customer if the selection signal has been received from said e-mail receiving device; and
  (g) the server having means for selecting from said stored e-mail messages the specific e-mail message relating to said received selection signal, selecting from a plurality of advertisements stored in an associate database an advertisement which corresponds to the recipient's name in said selected e-mail message header and which is aligned with the recipient personal interests, and downloading said selected e-mail message to said e-mail receiving device of the recipient and inserting said selected advertisement into said selected e-mail message as it is downloaded to said e-mail receiving device if the recipient is an opt-in customer.

6. The system according to claim 5, wherein the network is a wireless network.

7. The system according to claim 5, wherein the network is a wired network.

8. The system according to claim 5, wherein the network is a paging network.

9. The system according to claim 5, wherein the network is a satellite network.

10. The system according to claim 5, wherein the associate database archives a plurality of advertisements that are aligned with personal interests of corresponding recipients.

11. The system according to claim 5, wherein said e-mail receiving device is a personal computer.

12. The system according to claim 5, wherein said e-mail receiving device is a computer terminal.

13. The system according to claim 5, wherein said e-mail receiving device is a wireless telephone.

14. The system according to claim 5, wherein said e-mail receiving device is a wired telephone.

15. The system according to claim 5, wherein said e-mail receiving device is a printer.

16. The system according to claim 5, wherein said e-mail receiving device is a pager.

17. The system according to claim 5, wherein the network is a cable television network.

18. The system according to claim 5, wherein said e-mail receiving device is a television set.

19. The system according to claim 5, wherein said e-mail receiving device is a fax machine.

20. The system according to claim 5, wherein said server is a host-based server model.

21. The system according to claim 5, wherein said server is a Local Area Network server model.

\* \* \* \* \*